Figure 1:
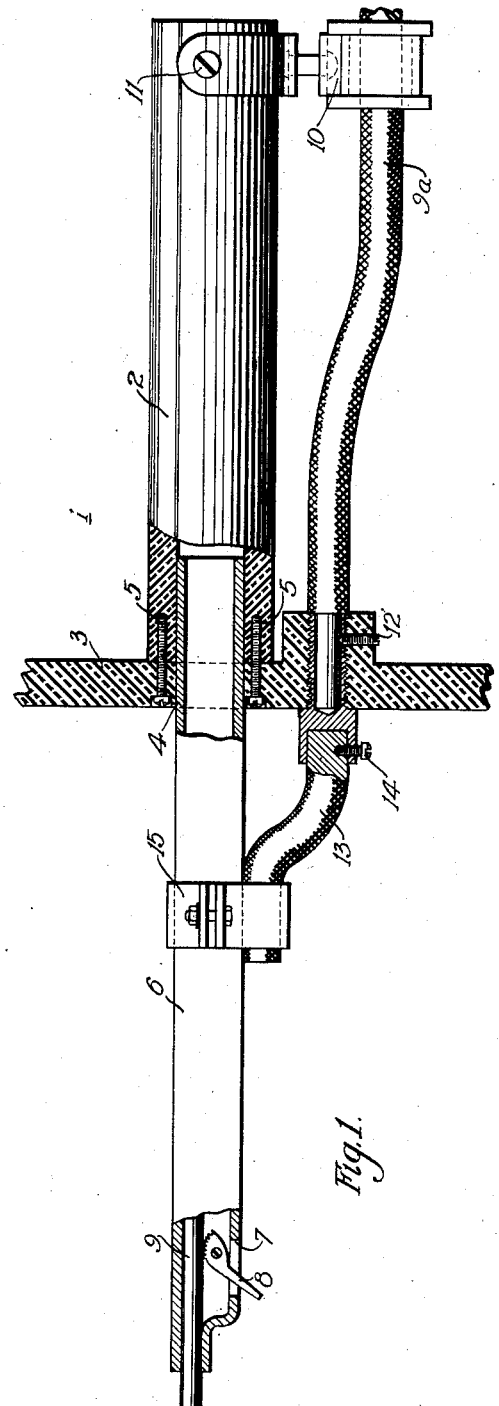

O. H. ESCHHOLZ
ELECTRODE HOLDER FOR ARC WELDING.
APPLICATION FILED NOV. 24, 1919.

1,384,439.

Patented July 12, 1921.

WITNESSES:
Geo. D. Barrett.
W. H. Woodman.

INVENTOR
Otto H Eschholz.
BY
Wesley G. Carr
ATTORNEY

UNITED STATES PATENT OFFICE.

OTTO H. ESCHHOLZ, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRODE-HOLDER FOR ARC-WELDING.

1,384,439.  Specification of Letters Patent.  Patented July 12, 1921.

Application filed November 24, 1919. Serial No. 340,244.

*To all whom it may concern:*

Be it known that I, OTTO H. ESCHHOLZ, a citizen of the United States, and a resident of Wilkinsburg, in the county of Allegheny and State of Pennsylvania, have invented a new and useful Improvement in Electrode-Holders for Arc-Welding, of which the following is a specification.

My invention relates to electrode holders for arc welding and it has, for its primary object, the provision of electrode holders which shall facilitate overhead welding.

It is well known that overhead welding can be done only by means of electrical systems, but such welding is relatively difficult, even by means of electrical welding systems. On account of the somewhat awkward position which the operator must assume in doing overhead welding, it is difficult for him to maintain a steady arc. Furthermore, although most of the metal is transferred across the arc, some of the fused metal tends to run down the electrode and, if the operator is not careful, he may receive more or less severe burns.

One object of my invention, therefore, resides in the provision of electrode holders which shall afford a maximum protection to the operator against fused metal which drips from the electrode and which shall be so constructed as to facilitate the manipulation of the arc in doing overhead welding.

It frequently happens that an electrode "freezes" to the work which makes it necessary for the operator to apply a sudden force thereto in order to release the electrode. Provision must, therefore, be made against forcibly withdrawing the electrode from the holder when the operator applies force to release it from the work to which it has become "frozen." Another object of my invention, therefore, resides in the provision of an electrode holder which shall grip the electrode in such manner that considerable force may be applied thereto without withdrawing it from the holder.

With these and other objects in view, my invention will be more fully described, illustrated in the drawings, in the several views of which corresponding numerals indicate like parts; and then particularly pointed out in the claims.

Figure 2:
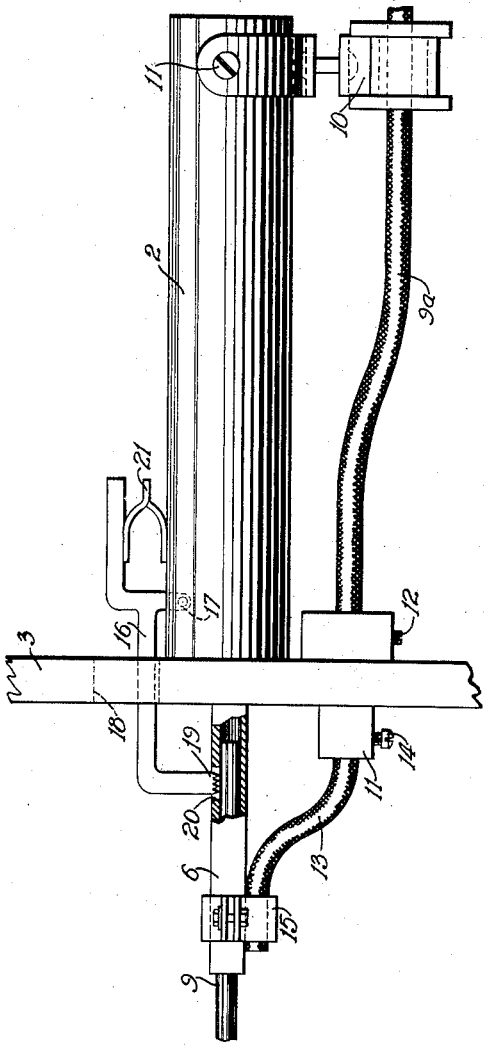

In the drawings, Figure 1 is a side view, partly in elevation and partly in section, of an electrode holder which embodies my invention, and Fig. 2 is a similar view of a modified form of electrode holder.

Heretofore, electrode holders have been provided in which the electrodes were so gripped as to project angularly therefrom. In practising my invention, I construct an electrode holder by providing a supporting member secured within a hollow handle provided with a shield, the supporting member being so constructed as to be adapted to support an electrode substantially in alinement with its longitudinal axis. The particular construction of the electrode holder assures a minimum of weight and sufficient mechanical strength to particularly adapt it for overhead welding. The shield is so disposed between the electrode and the handle of the holder as to afford a maximum degree of protection for the operator.

In Fig. 1 is shown an electrode holder 1 comprising a hollow handle 2, formed of any suitable insulating material, to which a shield 3, also of insulating material and provided with a central opening 4, is secured by means of screws 5. A tubular supporting member 6, preferably formed of metal, is extended through the opening in the shield and is carried by the handle 2 into which it extends. The supporting member 6 is provided with an opening 7 adjacent its free end, through which the end of a gripping member 8 extends, the gripping member being pivotally mounted within the supporting member 6 in such manner as to be adapted to firmly grip an electrode 9 disposed therein.

It will be apparent, from examination of the gripping member 8, that it is so formed and supported within the member 6 as to offer a maximum degree of resistance to a force tending to withdraw the electrode 9 from the supporting member 6, provided it is forced into engagement with the electrode by operating the end thereof which projects through the opening 7. In order to provide means for leading current to an electrode 9, supported within the metallic member 6, a lead-in cable 9ª is supported, at one end of the handle 2, by a swivel supporting device 10, which is secured to the handle 2 by means of screws 11. One end of the cable 9ª is secured within a metallic bushing 11, screwed into the shield 3, by a set screw 12. A suitable conductor 13 is secured, at one end, by a set screw 14 within the bushing 11 and is secured in engagement with the supporting member 6, at its other end, by a clamping device 15.

In order to prepare for a welding operation, the electrode 9 is inserted into the supporting member 6, over the gripping member 8, which offers substantially no resistance to such movement of the electrode. The gripping member may then be made to tightly engage the electrode and force it into intimate engagement with the supporting member 6 by drawing the portion extending through the opening 7 toward the operator or the handle 2. The tool or holder 1 is now in readiness for operation, and the electrode may be fused and deposited upon the work until the arc approaches closely to the end of the supporting member 6, when the electrode 9 may be freed by applying pressure to the gripping member 8 in the reverse direction to that employed in forcing it into engagement with the electrode. The electrode may then be readily withdrawn and another inserted.

In Fig. 2 is shown a modification of my invention in which substantially the same construction is employed as shown in Fig. 1, with the exception of the means for gripping the electrode within the supporting member 6. In this instance, a suitably shaped lever arm 16 is pivotally mounted upon the handle 2, as indicated at 17, and extended through an opening 18 provided in the shield 3. The lever arm 16 is provided, at its working end, with a roughened head 19 which extends through an opening 20 in the top of the supporting member 6. Considerable pressure is maintained, by a leaf spring 21, to force the head 19 through the opening 20 into engagement with an electrode 9. The manner of gripping the electrode 9 necessitates a slight change in the character of the supporting member 6, in that it may be made smaller in diameter and is provided with an opening adjacent the shield rather than near its free end.

The operation of the holder shown in Fig. 2, is obvious from the foregoing description. The electrode 9 may be disposed within the supporting member 6 by exerting a downward pressure upon the lever arm 16 above the spring 21, which causes the working head 19 thereof to be withdrawn from the supporting member 6. The electrode is then disposed within the supporting member 6 and the lever arm 16 is released, thereby causing the working head 19 to firmly grip the electrode.

It will be appreciated, from the foregoing description that my electrode holder is particularly simple in construction and, therefore, light in weight. The light weight of the electrode holder is an advantage in that it facilitates manipulation and, as a result, it is less tiring to an operator to maintain an overhead arc. Furthermore, by providing means for so gripping the electrode that it is in alinement with the axis of the holder, an operator may assume a more comfortable position while maintaining an arc overhead.

Although I have shown and specifically described a plurality of electrode holders which embody my invention, it is obvious that minor changes may be made in the construction thereof without departing from the spirit or scope of my invention, and I desire, therefore, that no limitations shall be imposed except such as are indicated in the appended claims.

I claim as my invention:—

1. An electrode holder comprising a handle, a shield secured thereto, a tubular supporting member carried by the handle, and means for securing an electrode in the supporting member substantially in alinement with the axis thereof.

2. An electrode holder comprising a hollow handle, a shield secured thereto, a tubular supporting member disposed within, and projecting from, the handle, and means for securing an electrode in the supporting member substantially in alinement with the axis thereof.

3. An electrode holder comprising a hollow handle, a shield secured thereto, a tubular supporting member disposed within, and projecting from, the handle, and means, pivotally mounted on the supporting member, for securing an electrode therein, substantially in alinement with the axis thereof.

4. An electrode holder comprising a hollow handle, a shield secured thereto, a tubular supporting member disposed within, and projecting from, the handle, and means, pivotally mounted on the handle, for securing an electrode in the supporting member substantially in alinement with the axis thereof.

5. An electrode holder comprising a hollow handle, a shield secured thereto, a tubular supporting member carried by the handle, a lever arm pivotally mounted on the handle and adapted to engage an electrode disposed within the supporting member, and means for maintaining the lever arm in engagement with the electrode.

6. An electrode holder comprising a handle, a shield secured thereto, a supporting member carried by the handle, means for securing an electrode to the supporting member substantially in alinement with the axis thereof, and means for leading current to the supporting member.

7. An electrode holder comprising a handle, a shield secured thereto, a supporting member carried by the handle, means for securing an electrode to the supporting member substantially in alinement with the axis thereof, means for supporting a conductor in substantially parallel relation to the handle, and means for electrically connecting the conductor to the supporting member.

In testimony whereof, I have hereunto subscribed my name this 18th day of November, 1919.

OTTO H. ESCHHOLZ.